(12) United States Patent  
Ohta et al.

(10) Patent No.: US 6,321,165 B1  
(45) Date of Patent: Nov. 20, 2001

(54) AIR FLOW MEASUREMENT APPARATUS

(75) Inventors: Kenji Ohta, Hitachinaka; Atsushi Kanke, Hitachi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/215,246

(22) Filed: Dec. 18, 1998

(30) Foreign Application Priority Data

Dec. 19, 1997 (JP) .................................................. 9-351292

(51) Int. Cl.[7] .................................................. G01F 1/64
(52) U.S. Cl. .................................. 702/45; 73/1.34; 702/183
(58) Field of Search .................................. 73/1.34, 1.88, 73/1.16, 1.29, 861, 861.01, 861.02, 861.03; 701/29, 99, 100–107, 109, 113, 115; 123/704, 700, 697; 702/45, 50, 114, 182–183, 189, 100

(56) References Cited

U.S. PATENT DOCUMENTS

| | | | |
|---|---|---|---|
| 4,375,667 | * 3/1983 | Buchan | 364/418 |
| 4,404,846 | * 9/1983 | Yamauchi et al. | 73/118 |
| 4,669,052 | * 5/1987 | Bianco | 364/571 |
| 4,719,794 | * 1/1988 | Ruiz | 73/118 |
| 5,050,562 | * 9/1991 | Ishii et al. | 123/489 |
| 5,107,812 | 4/1992 | Takamoto et al. . | |
| 5,469,750 | * 11/1995 | Lloyd et al. | 73/861.61 |
| 5,638,788 | * 6/1997 | Sanvido et al. | 123/339.2 |
| 6,151,547 | * 11/2000 | Kumar et al. | 701/101 |

* cited by examiner

*Primary Examiner*—Marc S. Hoff  
*Assistant Examiner*—Edward Raymond  
(74) *Attorney, Agent, or Firm*—Crowell & Moring, LLP (57) ABSTRACT

In a heating resistor type air flow measurement apparatus, flow correction data are read out from a primary memory and stored in a secondary memory, and then an air flow signal is calibrated by the flow correction data stored in the secondary memory when starting the apparatus up. The apparatus has a diagnosis unit, for determining whether or not the flow correction data stored in the primary memory are correct, so that the determination processing of the flow correction data by the diagnosis unit is performed at any time at least including the starting-up point of the apparatus. There is no fear that engine control based on abnormal flow correction data will continue.

6 Claims, 7 Drawing Sheets

PRIOR ART

FIG. 8  PRIOR ART

AIR FLOW MEASUREMENT APPARATUS

BACKGROUND OF THE INVENTION

The present invention relates to an air flow meter comprising a heating resistor provided in an air passage. The flow of air is measured, and a constant temperature control circuit keeps the temperature of the heating resistor at a predetermined value by controlling a current supplied to the heating resistor. The invention particularly relates to a heating resistor type air flow measurement apparatus suitable for the measurement of the intake air flow in an automobile engine.

In recent years, a method of controlling the amount of fuel supplied as a function of intake air flow has generally been used in engines (internal combustion engines) for automobiles. In such a control method, an air flow meter is widely used. A heating resistor type air flow measurement apparatus is one such air flow meter, and today, is in mainstream use.

An output signal of the heating resistor type air flow measurement apparatus is supplied, for example, to an ECU (engine control unit) of an automobile. The output signal is supplied, for example, to control the amount of fuel supplied to the engine. While the output signal is supplied, it is necessary to perform predetermined adjustment of an air flow signal or calibration.

By calibration is meant scale matching of instruments and adjustment so that the zero point and the spun (sensitivity) fall within predetermined specification ranges.

In the prior art, the flow-detection characteristics of each heating resistor type air flow measurement apparatus is checked and adjusted so as to fall within a range of specifications before product-shipment.

A resistance trimming method of adjusting a value of the resistance of a resistor is widely used today as such an adjusting method. By using the resistance trimming method, the zero point and the spun are adjusted so that the measurement output may fall within the range of specifications.

An alternative to the resistance trimming method is described in U.S. Pat. No. 4,669,052. This alternative is described as "an electronic trimming" or a multi-points correction method which uses digital data.

In the multi-points correction method, correction is made by using the digital data instead of the resistance value of a resistor. A map in which the predetermined data are stored is retrieved, an air flow is corrected by obtaining an air flow value and a flow error, and a signal indicative of the correct flow is output.

The characteristics of the flow correction data QaMap (q,a,b) used are checked for every apparatus, after product completion, and the data required to correct the error are calculated and maintained. The correction processing by the flow correction data QaMap (q,a,b) corresponds to the adjustment processing in resistance trimming. The trimmed and calibrated flow value is obtained as an after-correction flow value QaRef.

In the prior art, the flow correction data QaMap (q,a,b) for trimming are stored in the primary memory means, for example, before product shipment. The flow correction data QaMap (q,a,b) are read from the primary memory means when the operation of the apparatus is started up; for example, these data are read when turning the power switch on. The flow correction data QaMaP (q,a,b) read are stored in the predetermined memory set on a program area or the secondary memory means to be used as a Q map.

As the primary memory means, for example, EEPROM (Electrically Erasable/Programmable Read Only Memory) is used. This is a kind of nonvolatile memory which makes it possible to read/write data at any time.

In the above-mentioned prior art, the reliability of the flow correction data stored in the secondary memory means is not taken into consideration. There is, therefore, a problem in that an abnormal measurement flow value is output, as it is, even when the flow correction data become abnormal.

If the secondary memory is set on the program area, then the probability that the table data (Q map) stored in the secondary memory means to correct the flow will become abnormal is low. However, there is a possibility that the data set before product shipment will change, because the original flow correction data stored in a memory, such as the EEPROM or the primary memory means, can possibly be read/written after product installation.

Therefore, a write-protect for the data is provided, except for the adjusting step for the product. In the above-mentioned prior art, however, the data are read from the EEPROM, for example, when turning the power on. Consequently, there is fear that the data are written erroneously. As a result, the flow correction data actually used in the correction process may become abnormal.

When the data are read erroneously, the data for use in the correction of the flow error become abnormal, and thus suitable correction can not be made. As a result, the output value of a sensor (data after correction) does not fall within the range determined by the specifications, and the control of an engine becomes abnormal.

SUMMARY OF THE INVENTION

An object of the present invention is to provide a heating resistor type air flow measurement apparatus using an electronically trimming method in which the occurrence of a flow error caused by an abnormality in the flow correction data can be prevented in advance, and in which a suitable flow value, with error-correction, is output at any time.

According to one aspect of the present invention, in a heating resistor type air flow measurement apparatus, flow correction data are read out from a predetermined primary memory means and stored in a secondary memory means. An air flow signal is then calibrated, by the flow correction data stored in the secondary memory means, when starting the apparatus up. The apparatus comprises a diagnosis means for determining whether or not the flow correction data stored in the primary memory means are correct. The determination processing of the flow correction data by the diagnosis means is performed at least at the starting-up point of the apparatus.

According to the diagnosing method of the present invention, it is possible to determine whether or not the flow correction data actually used for the correction are abnormal. As a result, there is no fear that an engine control based on the abnormal flow correction data will continue.

BRIEF DESCRIPTION OF THE DRAWINGS

In the drawings, like reference characters denote like parts in the various views.

DESCRIPTION OF THE PREFERRED EMBODIMENTS

Before describing the present invention, the prior art will be concretely explained by referring to FIGS. 6(a) to 8.

Figure 6A:
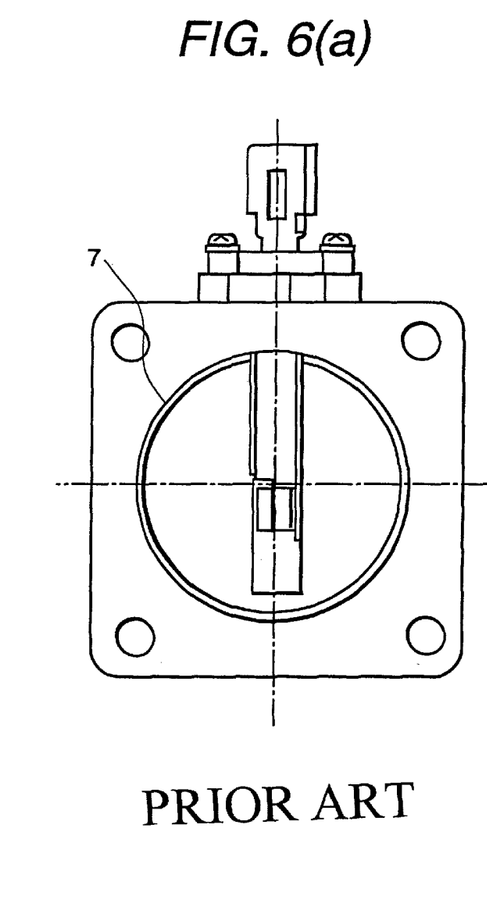
FIGS. 6(a) and 6(b) are views showing the configuration of a general heating resistor type air flow measurement apparatus.
Figure 6B:
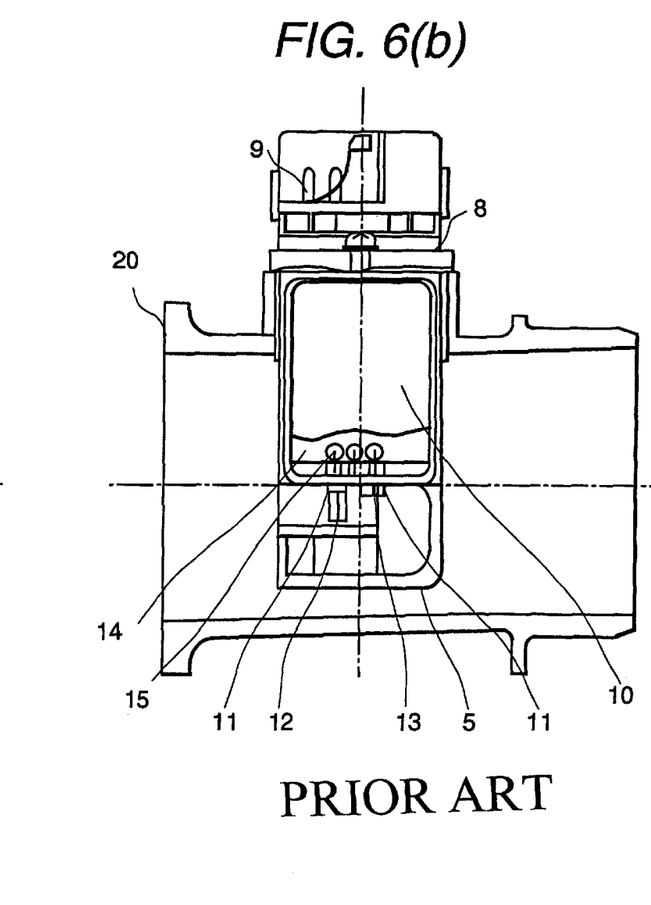

FIGS. 6(a) and 6(b) show one example of a heating resistor type air flow meter for automobiles. FIG. 6(a) is a view of the air flow meter from the front, and FIG. 6(b) is a sectional view of the air flow meter from the side. In these figures, reference number 5 designates a member forming an auxiliary air passage. These figures also show a body 7 of a flow measurement part, a housing member 8 for installing the body 7 of the flow measurement part, a connector portion 9 for connection to a circuit, a cover member 10, a support member 11 made of a conductive wire, a heating resistor (RH) 12, a temperature-sensitive resistor (RC) 13, a circuit board 14, a circuit board connection portion 15, and a cylindrical member 20, forming a portion of an air intake passage of an engine, inserted in the air intake passage.

The member 5 forms an auxiliary air passage, and the housing member 8 for installing the body of the flow measurement part, the connector portion 9, the heating resistor (RH) 12, the temperature-sensitive resistor (RC) 13 and the circuit board 14 are combined as an integrated module. The body 7 is thereby formed as part of the flow measurement part.

An opening of a predetermined shape is provided in the side wall of the cylindrical member 20. The body 7 of the flow measurement part is inserted inside through the opening. Further, the auxiliary air passage formed by the member 5 is positioned, inside the cylindrical member 20, by screwing the housing member 8 to the cylindrical member 20.

Both the heating resistor 12 and the temperature-sensitive resistor 13 are made of conductive material with temperature- dependent electric resistance. The heating and the temperature sensitive resistors are held in the auxiliary air passage formed by the member 5. As shown in FIGS. 6(a) and 6(b), the heating resistor 12 is arranged almost perpendicularly to the airflow passing through the auxiliary air passage, thereby exposing it to the air flow. On the other hand, the temperature-sensitive resistor 13 is arranged almost in parallel with the air flow.

Figure 7:
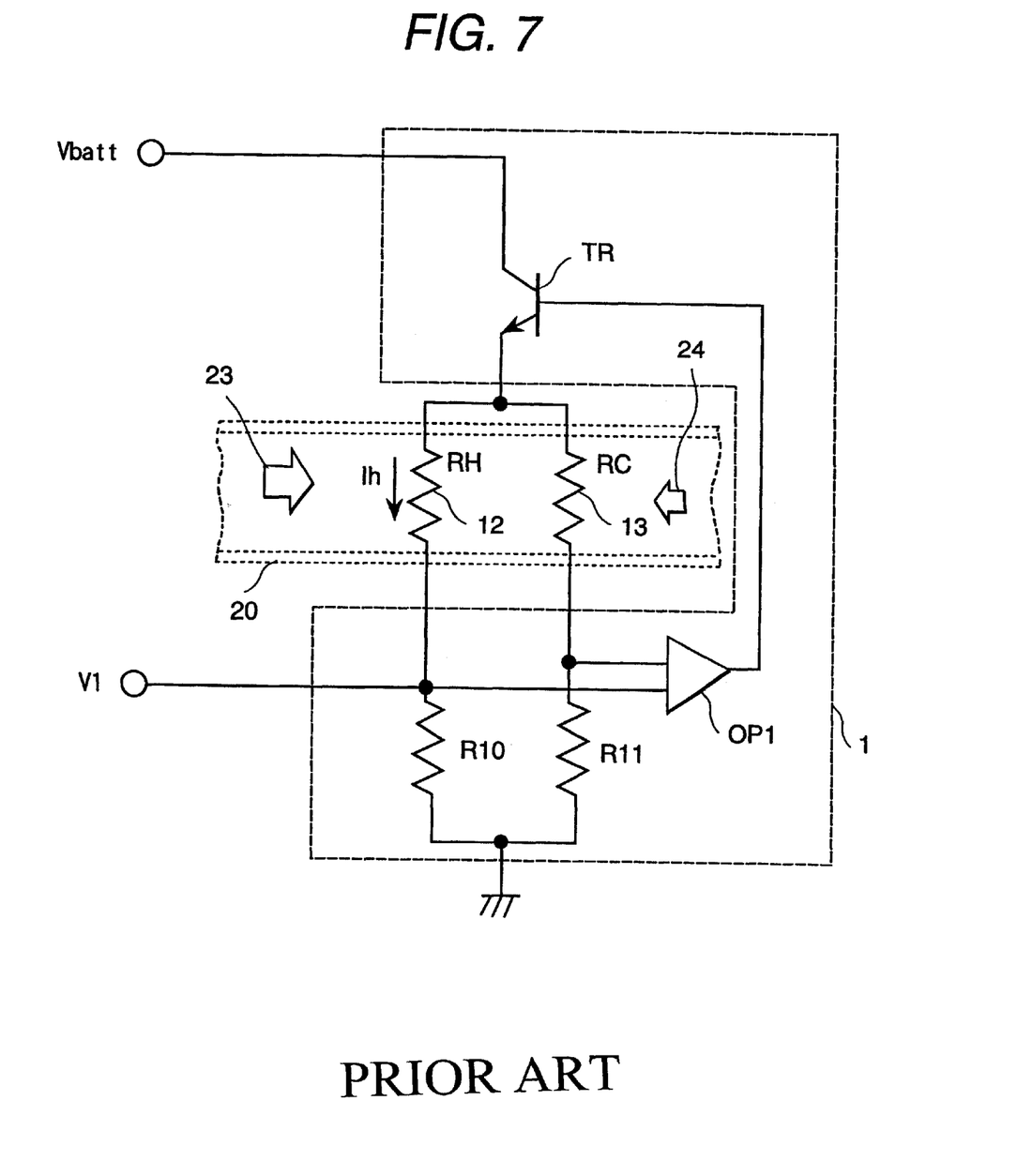
FIG. 7 is a circuit diagram showing a drive circuit of the general heating resistor type air flow measurement apparatus.

FIG. 7 shows the drive circuit 1 mounted on the circuit board 14. Broadly, the drive circuit 1 comprises a bridge circuit and a feedback circuit.

The bridge circuit comprises the heating resistor 12 , a fixed resistor R10, the temperature-sensitive resistor 13, and a fixed resistor R11. The feedback circuit comprises an operational amplifier OP1 and a transistor TR. The heating resistor is heated by a heating current Ih controlled by the bridge circuit and the feedback circuit to maintain the difference between the temperatures of the heating resistor 12 and the temperature-sensitive resistor 13.

Under such a condition, if the air flow is in the direction shown by the arrow 23, then the amount of heat carried off from the heating resistor 12 increases. The amount of heat carried off at this time is a function of the speed of the air flow, which increases according to the flow speed. On the other hand, the temperature of the temperature-sensitive resistor 13 mainly depends on that of the air rather than on the flow speed.

Therefore, if the air flow occurs, then the resistance value of the heating resistor 12 and the resistance value of the temperature-sensitive resistor 13 become imbalanced. The feedback control is performed to provide a larger flow of heating current Ih, thereby maintaining the balance of the bridge circuit. As a result, the value of the heating current Ih changes according to the amount of air flow. In other words, as the flow increases, the value of the heating current Ih becomes larger.

Because the heating current Ih also passes through the fixed resistor R10, a voltage drop due to the heating current Ih appears on the fixed resistor Rh. A voltage indicative of the flow or a sensor signal Vt can be obtained by picking up the voltage drop. Therefore, the fixed resistor Rh functions as a sensor for measuring the air flow.

Figure 1:
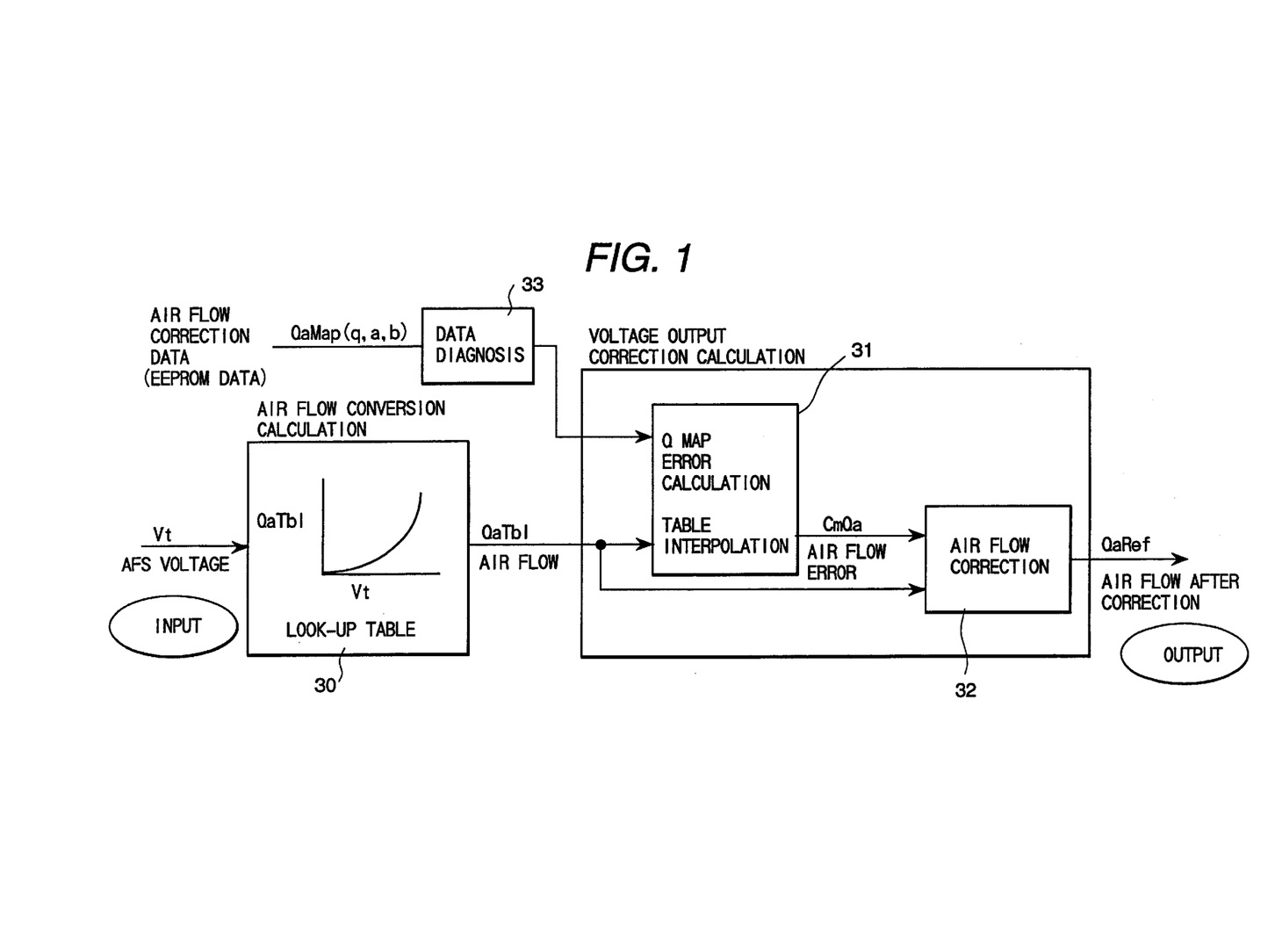
FIG. 1 is a block diagram showing processing according to an embodiment of the present invention.

Such a heating resistor type air flow measurement apparatus has an inherent measurement error, for example, due to the variation of the resistance value of each of the resistors forming the drive circuit 1 shown in FIG. 1, or due to the offset of the operational amplifier OP1. It is necessary, a result, to adjust or calibrate the apparatus so that the zero point and the spun (sensitivity) may fall within the predetermined range of specifications.

In the prior art, the flow-detection characteristics of each heating resistor type air flow measurement apparatus is checked and adjusted so that they fall within the range of specifications before product shipment.

A resistance trimming method of adjusting a value of the resistance of a resistor is widely used today as such an adjusting method. By using this method, the zero point and the spun are adjusted so that the measurement output may fall within the range of specifications.

An alternative to the resistance trimming method is described in U.S. Pat. No. 4,669,052 mentioned earlier. This alternative is described as "an electronic trimming" or a multi-points correction method which uses digital data.

In the prior art or multi-points correction method, a correction is made by using digital data instead of the resistance value of a resistor. In particular, a map in which the predetermined data are stored is retrieved, an air flow is corrected by obtaining an air flow value and an flow error, and, thus, a signal indicative of the correct flow is output. The conventional heating resistor type air flow measurement apparatus to which the multi-points correction method is applied will be explained.

Figure 8:
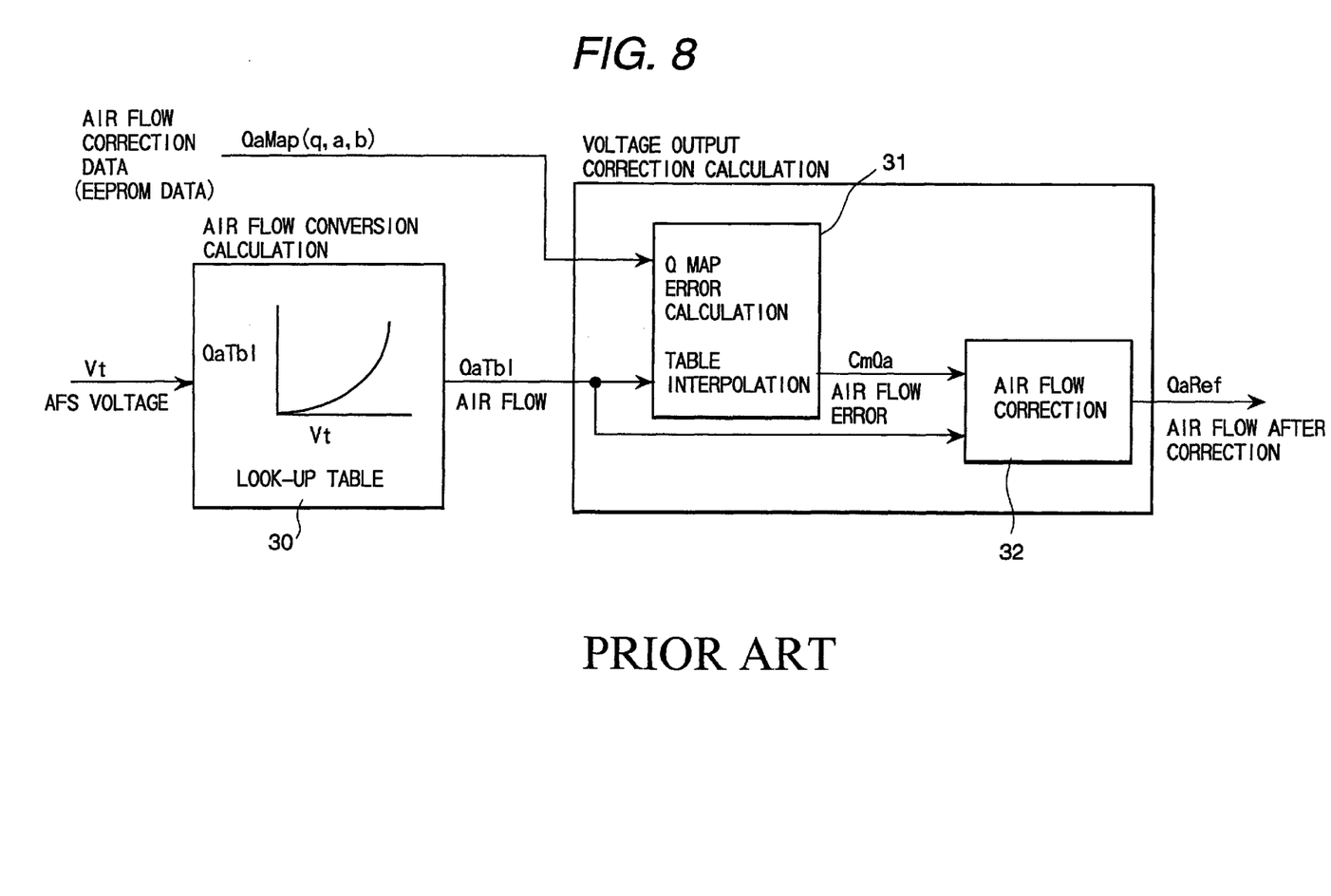
FIG. 8 is a block diagram showing processing in one example of a conventional heating resistor type airflow measurement apparatus in which an electrically trimming method is performed.

The prior art process shown by the block diagram of FIG. 8 comprises an air flow conversion calculation (block 30), a voltage output correction calculation (block 31), and a flow correction (block 32). In block 32, the flow conversion table (ROM table), pre-stored in a ROM, is retrieved by using a sensor signal (voltage value) Vt input from the drive circuit 1 of the air flow measurement part (AFS), shown in FIG. 7, to provide for conversion into the air flow QaTbl.

The air flow conversion calculation in block 30 is a calculation for converting the voltage or the sensor signal Vt into the air flow; this calculation corresponds to pre-treatment of the trimming processing.

Therefore, the air flow conversion table used is set for every model and, thus, the same model has the same table.

In other words, the air flow conversion table is not for trimming processing.

Next, in block 31, the flow error CmQa is calculated from the air flow QaTbl input by using the flow correction data QaMap (q,a,b) pre-stored in a memory as the Q map (flow map). In this calculation, for example, a table interpolation method may be used.

In block 32, the air flow value QaTbl is corrected by using the flow error CmQa, thereby calculating the after-correction flow value QaRef.

The characteristics of the flow correction data QaMap (q,a,b) used are checked for every apparatus after product-completion, and the data required to correct the error are calculated and maintained. The correction processing by the flow correction data QaMap (q,a,b) corresponds to adjustment processing in resistance trimming. The trimmed and calibrated flow value is obtained as an after-correction flow value QaRef.

In the prior art, the flow correction data QaMap (q,a,b) for trimming are stored in the primary memory means, for example, before product shipment. The flow correction data QaMap (q, a, b) are read from the primary memory means when the operation of the apparatus is started; these data, for example, are read when turning the power switch on. The flow correction data QaMaP(q,a,b) read are stored in the predetermined memory set on a program area or the secondary memory means to be used as a Q map.

As the primary memory means, for example, EEPROM (Electrically Erasable/Programmable Read only Memory), which is a kind of nonvolatile memory permitting data reading/writing at any time, is used.

In the prior art mentioned above, the reliability of the flow correction data stored in the secondary memory means is not taken into consideration. There is, therefore, a problem in that an abnormal flow measurement value is output as it is even when the flow correction data become abnormal.

Embodiment 1

A heating resistor type air flow measurement apparatus of the present invention will now be explained in detail with reference to the attached drawings.

FIG. 1 shows a control block of one embodiment of the present invention. FIG. 1 shows a block 33 for data diagnosis, and other blocks which are the same as in the prior art described in connection with FIG. 8.

A data diagnosis block 33 represents data diagnosis which is controlled, for example, by a program control means (not shown). A power source for the air flow measurement apparatus is turned on by the program control means, and the data diagnosis block 33 is started up when the operation of the air flow measurement apparatus begins. At this time, flow correction data QaMaP(q,a,b) are checked. More particularly, the presence or absence of abnormality of the flow correction data is diagnosed.

In operation, a calculation for converting a sensor voltage signal Vt into the air flow is carried out in a block 30. This calculation corresponds to pretreatment of the trimming. Therefore, a detailed description of this calculation can be found in the description of the prior art provided above. Only the flow conversion table used in the conversion process will be explained hereinafter.

Figure 2:
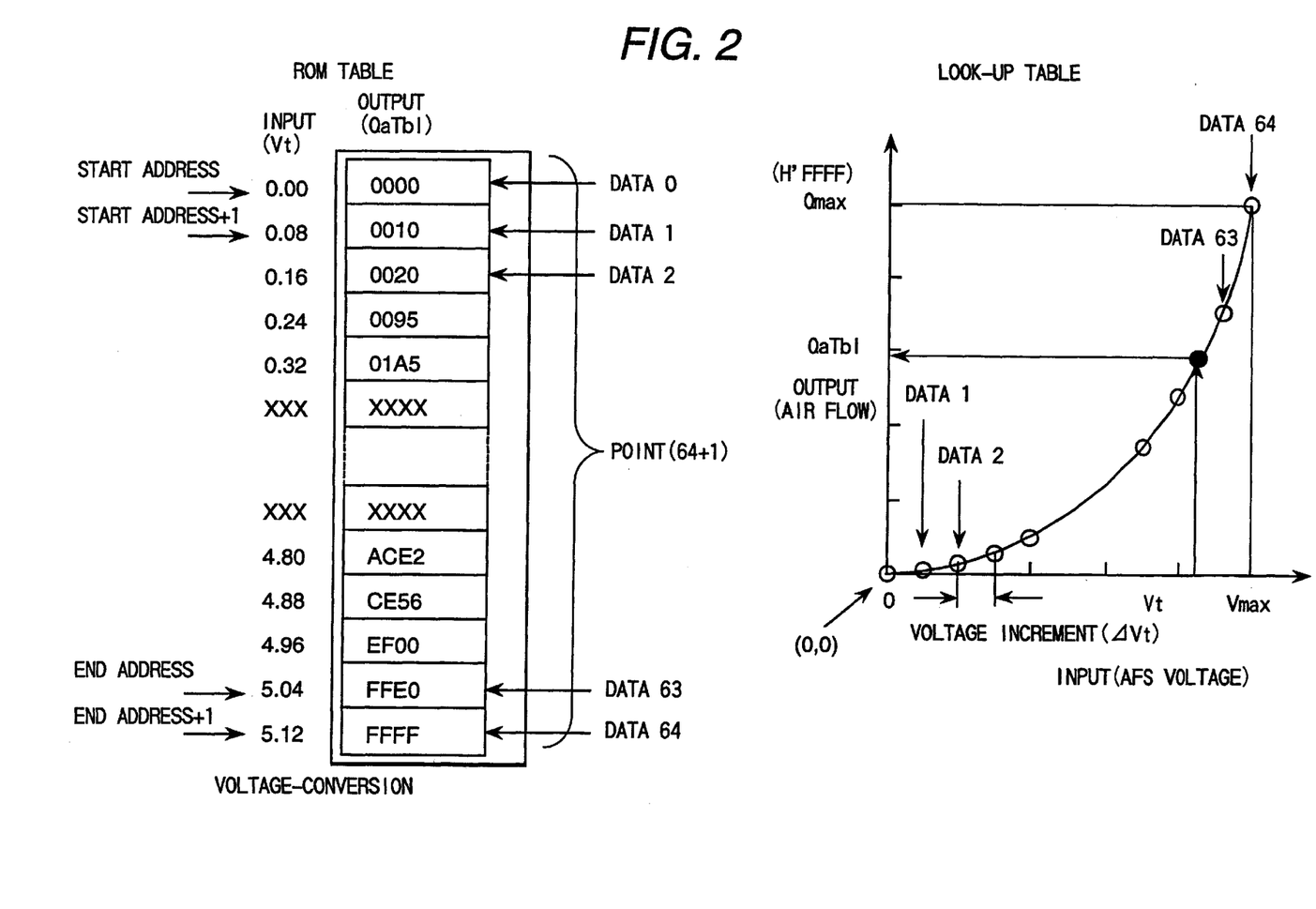
FIG. 2 is an illustration of a flow conversion table used in an embodiment of the present invention.

FIG. 2 shows an example of the flow conversion table. The flow conversion table is made up of 64 kinds of data and stored in a ROM (Read-Only Memory). Of course, the number of data types is not limited to 64.

As shown in FIG. 2, data look-up is performed based on the sensor signal Vt. The 64 kinds of data, from "0000" to "FFFF", are retrieved, and thus the air flow QaTbl is calculated by using linear interpolation.

In a block 31, the same calculation as in the corresponding block in the prior art processing of FIG. 8 is carried out. A flow error CmQa for trimming is calculated from the input air flow QaTbl by using the flow correction data QaMaP (q,a,b) as a Q map (flow map). At this time, the table interpolation is also used in the same way as in the prior art. A detailed description of the table interpolation is provided in the BACKGROUND OF THE INVENTION. The flow correction data QaMaP(q,a,b) read from the EEPROM will be discussed hereinafter.

Figure 3:
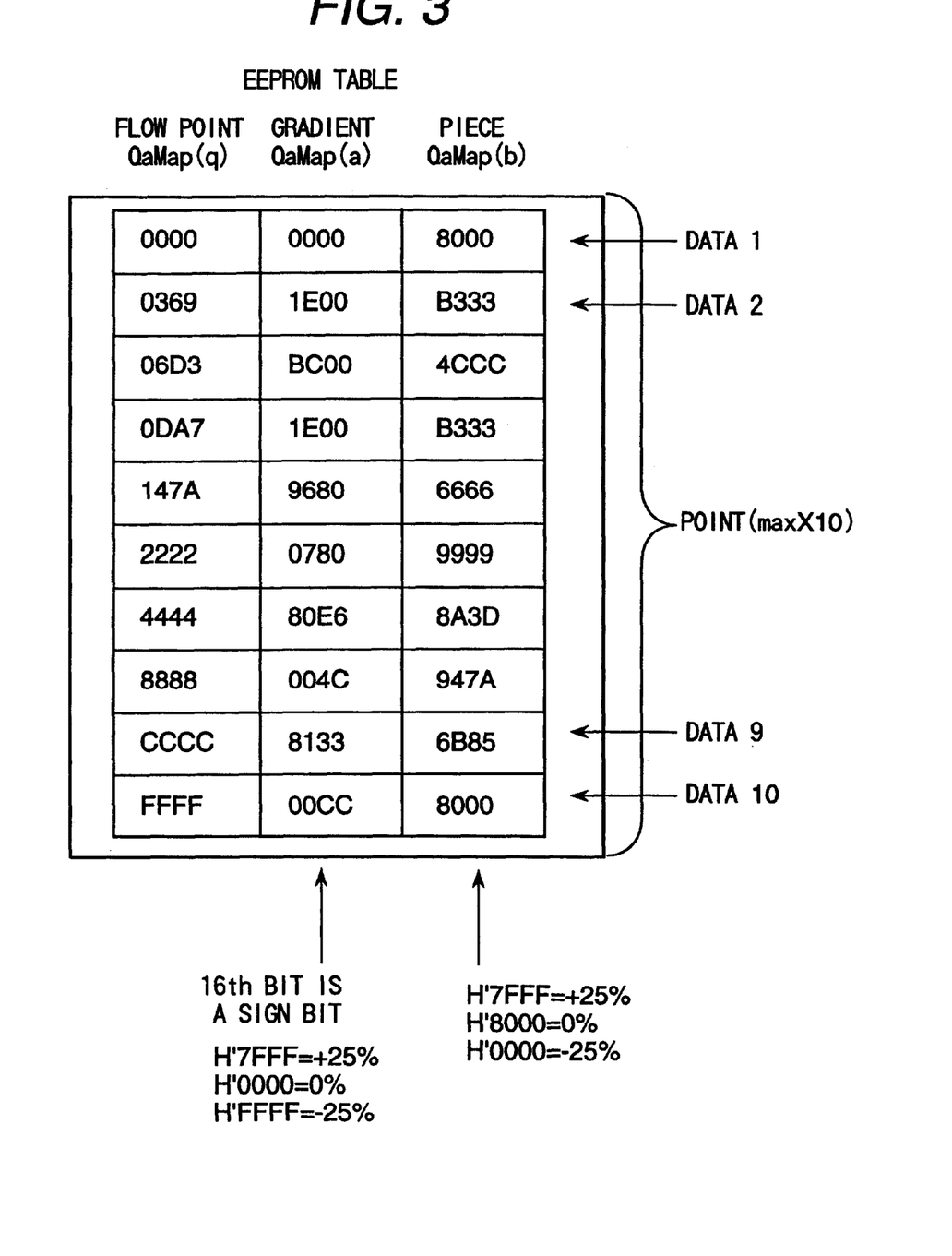
FIG. 3 is an illustration of a flow correction data table used in an embodiment of the present invention.

The flow correction data QaMaP(q,a,b) have a table scheme shown in FIG. 3, and comprise a flow point (q), a gradient (a) at that point, and a piece (b).

Figure 4:
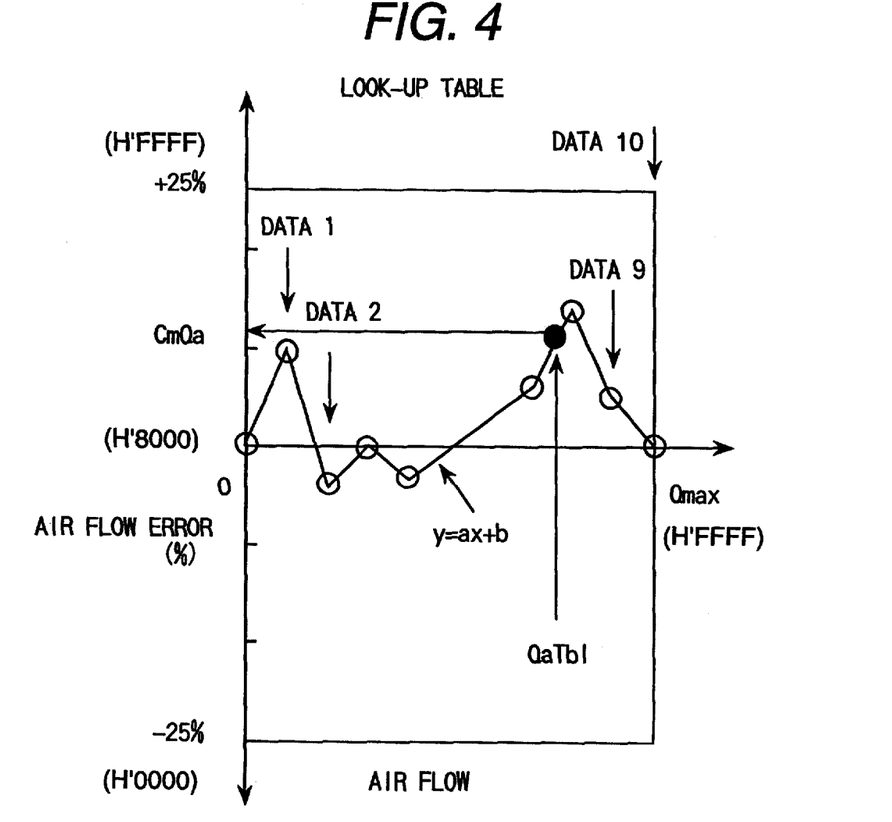
FIG. 4 is an illustration of retrieval from a table for data correction in an embodiment of the present invention.
Figure 5:
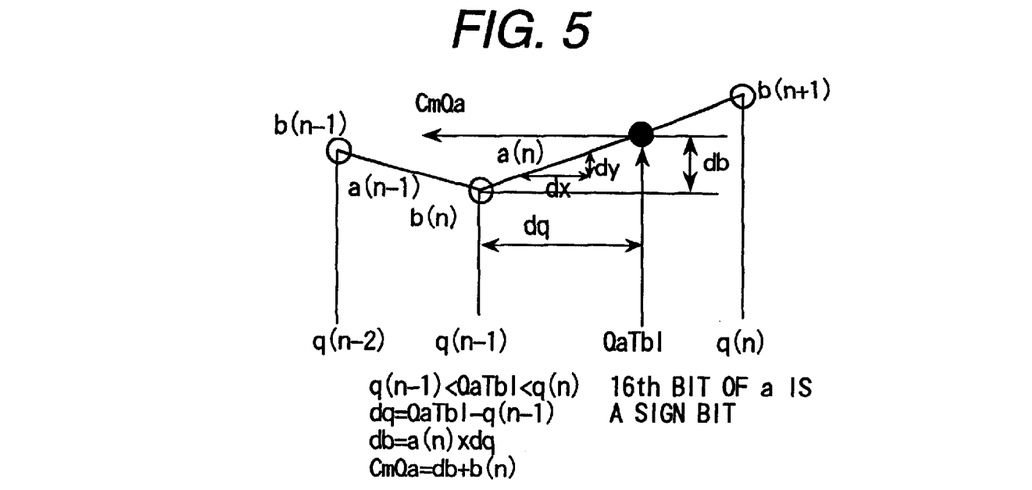
FIG. 5 is an illustration of data interpolation in an embodiment of the present invention.

The flow error CmQa is calculated directly from the input air flow QaTbl or by linear interpolation, as shown in FIGS. 4 and 5, by retrieving the data table.

In a block 32, the air flow QaTbl is corrected by using the flow error CmQa, and the corrected flow value QaRef is calculated. This processing is also the same as in the prior art processing of FIG. 8.

Next, the processing of a block 33 for data diagnosis will be explained.

In the data diagnosis represented by the block 33, the presence or absence of an abnormality is diagnosed by checking the flow correction data QaMaP (q,a,b), which are read from a primary storing means, and then set as the Q map in a secondary storing means when the power source of the air flow measurement apparatus is turned on and its operation is started up.

In a first embodiment of the present invention, the following method is used as the data diagnosis method represented in the block 33.

When the data are written in the first storing means or EEPROM, for example, before the shipment of products, the data are added every 1 byte. At the completion of the write, 1 byte of the lowest order of the result of addition is written in the EEPROM together with the data written at that time.

Under such a condition, also when the data are read, the data are added every 1 byte in the same way as the write. Finally, the result of addition is compared with the addition value obtained when the data are written. If the result and the valve obtained are equal to each other, then it is determined that the data just now read are correct.

A method according to a first embodiment will be explained more concretely with reference to the table of data shown in FIG. 3.

In data 10 of the data table of FIG. 3, the data of a flow point are FFFF (HEX), the data of a gradient are OOCC (HEX) and the data of a piece are 8000 (HEX).

Since the data are written every 1 byte, the form of transmission of the data is also every 1 byte as follows.

FF+FF+00+CC+80+00

The value obtained by adding the 6 bytes of data every 1 byte becomes equal to the above calculation result.

This is the addition value data written in the EEPROM after and together with the 6 bytes of table data.

Next, when the data are read, the addition is performed while reading the 6 bytes of data every 1 byte. The result of addition is compared with the addition value data obtained when the data read at 7th byte are written. If the result of addition and the addition value data coincide with each other, then it is determined that the data are correctly read and correctly written in the secondary memory means, and thus the flow correction data QaMap (q,a,b) are correct.

Therefore, at this time, the control of the engine continues at it is.

If the results of addition do not coincide with each other, then it is determined that the flow correction data QaMap (q,a,b) are abnormal. Processing done in an abnormal state is then performed. Therefore, a back-up system is completed.

When processing is done in an abnormal state, after the power is turned off once, either turning the power on again is urged or the flow correction data QaMap (q,a,b) for back-up use, set in the program area for such an abnormal state, are used, and the correction of the sensor signal is continued. It will be appreciated that any back-up processing may be performed based on requirements from the engine control system which uses the sensor signal.

According to the first embodiment of the present invention, if the flow correction data QaMap (q,a,b) used in the calibration of the sensor signal are abnormal, then processing done in an abnormal state is essentially performed. It is, therefore, possible to prevent, with high reliability, the fear that the vehicle operation performance will be deteriorated or that an exhaust gas processing unit will become abnormal due to exhaust gas deterioration.

Embodiment 2

A flow correction data diagnosing method according to a second embodiment of the present invention will next be explained.

The flow correction data diagnosing method according to the second embodiment is a method in which the continuity of the data, instead of the addition value of the data, is confirmed.

In the flow correction data, the gradient and the piece are defined for every flow point as shown in FIG. 3. Further, approximations are made to the flow correction data for every section of the flow defined.

It is, therefore, required that the neighborhoods of the table data are a series of the same data. Accordingly, the table data to be pre-stored in the EEPROM are defined to maintain the continuity and stored.

After reading the data, it is checked whether or not the first-order equation defined in each table is connected at the same connection point for every predetermined flow section. If so, then the data are determined to be correct. Otherwise, it is determined that the correction data are abnormal, and processing in an abnormal state is performed in the same way as the first embodiment.

Also according to the second embodiment of the present invention, if the flow correction data QaMap (q,a,b) used in the calibration of the sensor signal are abnormal, then processing in an abnormal state is essentially performed. It is, therefore, possible to prevent, with high reliability, the fear that the vehicle operation performance is deteriorated or that an exhaust gas processing unit has become abnormal due to exhaust gas deterioration.

While two kinds of data diagnosing methods have been described above as first and second embodiments, these diagnosing methods can be used at the same time.

Further, in the above embodiments, the calculating method based on the gradient and the piece has been used as a method for interpolating linearly the flow correction data.

However, another method, in which two coordinate points are provided in lieu of setting the gradient and the piece to the table, can be used, and a first-order linear interpolation can then be made based on the data.

Further, even if the number of table data is decreased, it is possible to use another interpolating method to provide correction with high accuracy. In this other interpolating method, three coordinate values are provided in the flow section to be set in the table, and the interpolation is made by a second-order curve based on the coordinate values. Also, by using this method, the correction data can be accurately diagnosed.

Further, even when the present invention uses a method of interpolating linearly from the first-order or second-order equation based on the coordinate values, it is possible to use either a method of comparing the addition values of the correction data stored or a method of determining whether or not the connection points of the data coincide with each other as a method of diagnosing the data from the gradient and the piece.

Further, while in the above embodiments, the EEPROM is used as the nonvolatile memory or the first memory means, it is possible to use other nonvolatile memories such as a flash memory and a ferroelectric memory. The same function as the above embodiment can be obtained.

In the above embodiments, considering the data will be changed later, a memory which makes it possible to rewrite tile data has been used as the first memory means in which the flow correction data for calibration is stored. However, if the data are not to be changed after adjustment data have been determined once, then it is possible to use a PROM (Programmable ROM).

According to the present invention, the reliability of the correction data can be sufficiently assured in the heating resistor type air flow measurement apparatus in which electronic trimming is used, and advantages of the electronic trimming method can be provided. As compared with the resistor trimming method, it is possible to remarkably decrease the burden of adjustment, and to provide an improved heating resistor type air flow measurement apparatus which can assure high reliability at low cost.

While the embodiments described represent the preferred form of the present invention, it is to be understood that changes and variations may be made without departing from the spirit of the invention.

What is claimed is:

1. A heating resistor type air flow measurement apparatus in which flow correction data are read out from a predetermined primary memory means and stored in a secondary memory means, and then an air flow signal is calibrated by the flow correction data stored in the secondary memory means, at a starting-up point of the apparatus, comprising:

a diagnosis means for determining whether or not the flow correction data stored in the primary memory means are correct, wherein determination processing of the flow correction data by the diagnosis means is performed at an arbitrary time at least including the starting-up point of the apparatus.

2. A heating resistor type air flow measurement apparatus according to claim 1, wherein said determination processing by the diagnosis means is a comparison processing for comparing the value obtained by adding each of the data calculated and stored when the flow correction data are stored in the primary memory means with the value obtained by adding each of the data when the flow correction data are read from the primary memory means.

3. A heating resistor type air flow measurement apparatus according to claim 1, wherein said determination processing by the diagnosis means is processing for comparing boundary values of the data with each other, obtained by interpolating linearly each of the data stored in the primary memory means.

4. A heating resistor type air flow measurement apparatus according to claim 3, wherein linear interpolation is defined by a primary equation of gradient and piece.

5. A heating resistor type air flow measurement apparatus according to claim 3, wherein linear interpolation is defined by a primary equation of two coordinate values.

6. A heating resistor type air flow measurement apparatus according to claim 3, wherein linear interpolation is defined by a primary equation of three coordinate values.

* * * * *